US012302921B2

United States Patent
Collins et al.

(10) Patent No.: US 12,302,921 B2
(45) Date of Patent: May 20, 2025

(54) EDIBLE INK FORMULATIONS INCLUDING CALCIUM CARBONATE

(71) Applicant: MARS, INCORPORATED, McLean, VA (US)

(72) Inventors: Thomas M. Collins, Hackettstown, NJ (US); David W. Stefany, Hackettstown, NJ (US); Kevin Stanton, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 628 days.

(21) Appl. No.: 17/254,064

(22) PCT Filed: Jun. 28, 2019

(86) PCT No.: PCT/US2019/039739
§ 371 (c)(1),
(2) Date: Dec. 18, 2020

(87) PCT Pub. No.: WO2020/006362
PCT Pub. Date: Jan. 2, 2020

(65) Prior Publication Data
US 2021/0259275 A1    Aug. 26, 2021

Related U.S. Application Data

(60) Provisional application No. 62/691,581, filed on Jun. 28, 2018.

(51) Int. Cl.
*A23G 3/34* (2006.01)
*A23G 3/36* (2006.01)

(52) U.S. Cl.
CPC .......... *A23G 3/343* (2013.01); *A23G 3/0089* (2013.01); *A23G 3/362* (2013.01);
(Continued)

(58) Field of Classification Search
CPC ...... A23G 3/343; A23G 3/0089; A23G 3/362; A23G 3/0097
See application file for complete search history.

(56) References Cited

U.S. PATENT DOCUMENTS 2,859,689 A   11/1958  Ackley
3,258,347 A   6/1966   Brown
(Continued)

FOREIGN PATENT DOCUMENTS

AU    2012200064 A1    2/2012
AU    2012216272 B2    10/2014
(Continued)

OTHER PUBLICATIONS

CN 106280685 A (Clarivate Machine Translation) (Year: 2017).*
(Continued)

*Primary Examiner* — Nikki H. Dees
*Assistant Examiner* — Andrew E Merriam
(74) *Attorney, Agent, or Firm* — Bookoff McAndrews, PLLC

(57) ABSTRACT

Alcohol water-based, edible ink formulations comprising scalenohedral calcium carbonate particles are provided. The calcium carbonate particles can act as a white pigment to impart white color properties to the edible ink formulations which provide improved print quality and durability. The edible ink formulations can be printed onto a variety of surfaces, including the surfaces of food products such as confectionery products and snack food products.

15 Claims, 7 Drawing Sheets

(52) U.S. Cl.
CPC ...... *A23G 2200/00* (2013.01); *A23G 2210/00* (2013.01); *A23G 2220/00* (2013.01)

(56) References Cited

U.S. PATENT DOCUMENTS

| | | | |
|---|---|---|---|
| 4,528,904 | A | 7/1985 | Ackley |
| 5,006,362 | A * | 4/1991 | Hilborn ................ A61K 9/2893 106/31.77 |
| 5,006,363 | A | 4/1991 | Fujii et al. |
| 5,655,453 | A | 8/1997 | Ackley |
| 6,569,472 | B1 | 5/2003 | Zyck et al. |
| 7,115,288 | B2 | 10/2006 | Witkewitz et al. |
| 7,884,953 | B1 | 2/2011 | Willcocks et al. |
| 9,492,395 | B2 | 11/2016 | Schad |
| 2004/0241208 | A1* | 12/2004 | Sowden ................ A61K 9/286 424/440 |
| 2005/0255205 | A1* | 11/2005 | Baydo ................ C09D 11/322 426/383 |
| 2007/0014913 | A1 | 1/2007 | Miller |
| 2007/0218222 | A1 | 9/2007 | Campbell et al. |
| 2011/0123696 | A1 | 5/2011 | Shastry et al. |
| 2011/0280942 | A1 | 11/2011 | Schad et al. |
| 2013/0058875 | A1 | 3/2013 | Murray et al. |
| 2013/0164356 | A1 | 6/2013 | Pfaff |
| 2014/0366777 | A1 | 12/2014 | Skrzypczak |
| 2015/0056124 | A1 | 2/2015 | Wenk |
| 2016/0015054 | A1 | 1/2016 | Stawski |
| 2016/0023915 | A1 | 1/2016 | Wenk et al. |

FOREIGN PATENT DOCUMENTS

| | | |
|---|---|---|
| CA | 2494534 A1 | 2/2004 |
| CA | 3033785 A1 | 3/2018 |
| CN | 1681393 A | 10/2005 |
| CN | 103131250 A | 6/2013 |
| CN | 104204351 A | 12/2014 |
| CN | 106280685 A * | 1/2017 |
| EP | 2537900 A1 | 12/2012 |
| JP | 2005298770 A | 10/2005 |
| JP | 2010235764 | 10/2010 |
| JP | 2010248313 A | 11/2010 |
| JP | 2013212864 A | 10/2013 |
| RU | 2575207 C2 | 2/2016 |
| WO | 9622030 A1 | 7/1996 |
| WO | 1996022030 A1 | 7/1996 |
| WO | 2010079103 A1 | 7/2010 |
| WO | 2012156231 A1 | 11/2012 |
| WO | 2013142473 A1 | 9/2013 |
| WO | 2014150438 A1 | 9/2014 |
| WO | 2014152417 A2 | 9/2014 |
| WO | 2016103149 A1 | 6/2016 |

OTHER PUBLICATIONS

Chen et al., Modified PCC used in Papermaking Processes, BioResources, 2015, 5125-5139, 10(3).
George Wypych, Handbook of Fillers, Chapter 2.1.19: Calcium Carbonate, 2000, 48-57, ChemTec Publishing, Toronto.
Hartel et al., Confectionary Science and Technology, 2018, 195 (378-379).
Kumar et al., Influence of Particle Size Distribution of Calcium Carbonate Pigments on Coated Paper Whiteness, 2011, 613-618, 8(5), J. Coat Technol. Res.
Pamela Gesford, The Manufacturing Confectioner, Panning Special Effects, Nov. 2001, 37-42, Colorcon.
Preparation and Use Guidelines—Opacode S-1, Opacode Product Information, 2015, Colorcon.
Regulation (EC) No. 139/2004 Merger Procedure, 2006.
Shellac & Food Glace—is it vegan?, GentleWorld, Aug. 15, 2011.
Speciality Minerals Inc., Product Chart: Calcium Carbonates, 2009.
Specialty Minerals Calcium Fortification, Specialty Minerals Calcium Fortification, 2011, pp. 1-12, Specialty Minerals.
Specialty Minerals ViCALity Light product data sheet, Specialty Minerals ViCALity Light product data sheet, 2000, p. 1-2, Brenntag.com.
www.mineralstech.com, Speciality Minerals Inc., a technical article, ViCALity Medium, 2013, Speciality Minerals Inc., a technical article, ViCALity Medium, 2013, 2013, 2 pgs, n/a, www.mineralstech.com.

* cited by examiner

FIGURE 1 – Print Rating System

| Rating System ||||
|---|---|---|---|
| Overall Print || Resolution/Sharpness ||
| 1 | No Print | 1 | No Print |
| 2 | Poor | 2 | Minor Visibility of Print |
| 3 | Fair | 3 | Light, Splotchy, and/or |
| 4 | Good | 4 | Mediocre Print |
| 5 | | 5 | |
| 6 | Very Good | 6 | Minor Flaws Visible |
| 7 | | 7 | |
| 8 | Excellent | 8 | Smooth, Clear Print |
| 9 | | 9 | |
| 10 | Perfect | 10 | |

FIGURE 2 – Comparative Formulation 1 (Alcohol/Shellac Based Ink Formulation)
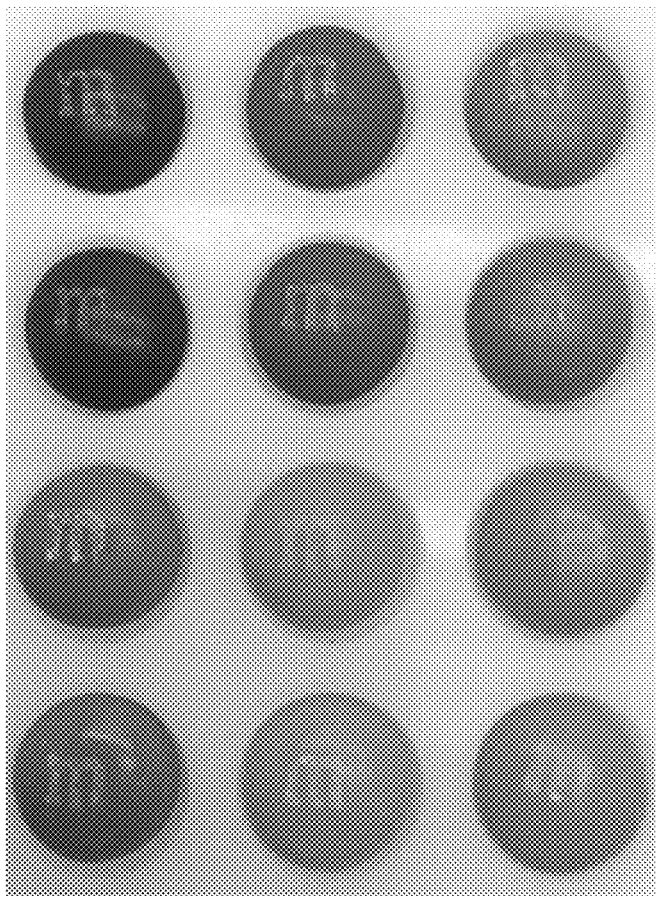

FIGURE 3 – Formulation 4 (HMPC/Alcohol/Water Based Ink Formulation)
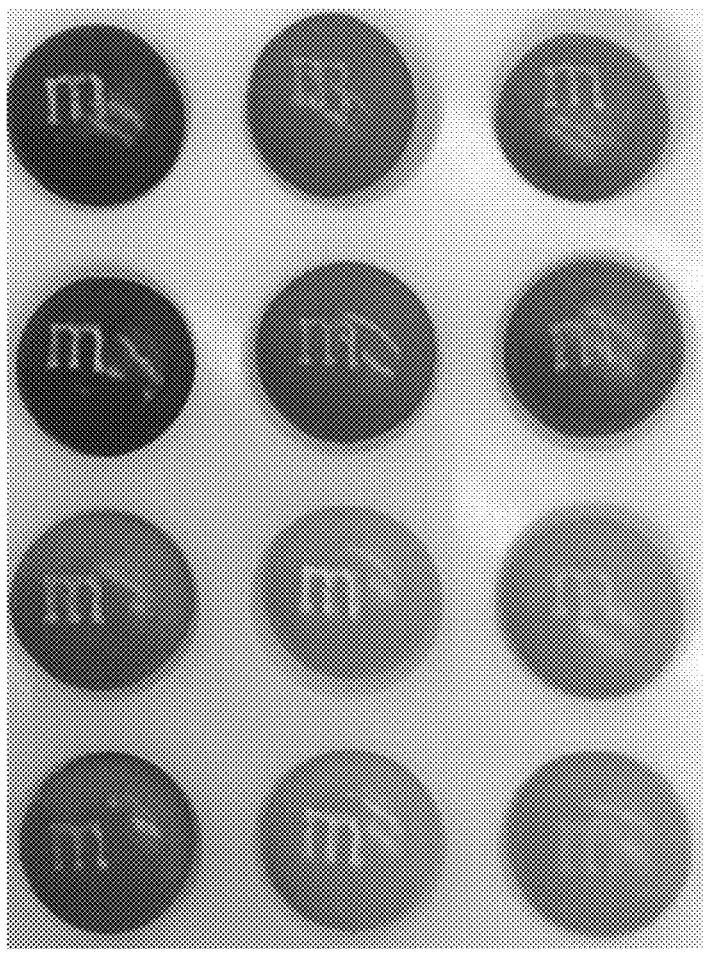

EDIBLE INK FORMULATIONS INCLUDING CALCIUM CARBONATE

FIELD OF THE INVENTION

The presently disclosed subject matter relates to novel edible ink formulations comprising calcium carbonate as a white pigment and aqueous alcohol-based solvents. The formulations of the present disclosure provide a desired print whiteness and opacity, successfully interfacing with machine printing and providing improved visual print quality and print durability.

BACKGROUND

Pigment grade titanium dioxide ($TiO_2$) is often used as a white pigment in a variety of applications, including paints, glazes, and colorants, and across a variety of industries including home goods, construction, paper products, consumer products, personal care products, and cosmetics. Titanium dioxide is also commonly used to provide a desirable white color and opacity to various food and confectionery products, including edible ink formulations.

However, there is confusion among some consumers between safety concerns associated with nanosize-grade titanium dioxide versus the thoroughly tested and safe pigment-grade titanium dioxide approved for food use. As such, there is a growing interest in replacing titanium dioxide with a different, natural white pigment to meet the consumer demand for food products made with natural ingredients. One possible substitute is rice starch. However, rice starch is unable to impart a "bright" white color, does not deliver sufficient opacity, and is used at much higher levels that can lead to issues with high viscosity as compared to titanium dioxide.

Previous ink compositions based on scalenohedral calcium carbonate and containing non-aqueous solvents (e.g., alcohol only solvents) were demonstrated to interface with transfer rotogravure print machines to create a visible print. However, the overall print quality, print resolution and print durability were not high compared to the performance of existing titanium dioxide based inks.

Thus, there is a need for improved edible white ink formulations with improved print quality and durability that do not include titanium dioxide. The presently disclosed subject matter addresses these and other needs as discussed in detail below.

SUMMARY OF THE INVENTION

The present disclosure provides improved edible ink formulations comprising scalenohedral calcium carbonate particles. The improved aqueous-alcohol solvent based inks provide machine print compatibility with improved print quality and print durability compared with previous calcium carbonate based ink formulations. The presently disclosed edible ink formulations can be used as a substitute for edible ink formulations comprising titanium dioxide.

In certain aspects, the present disclosure provides an edible ink formulation. The edible ink formulation includes scalenohedral calcium carbonate particles and an alcohol and aqueous solvent. When the edible ink formulation is prepared as a dry film, the edible ink formulation exhibits a print durability score of less than 70.

In certain aspects, the edible ink formulation can have an applied wet film thickness of about 60 μm or less.

In certain aspects, the edible ink formulation can have a dried film thickness of 30 μm or less.

In certain aspects, the calcium carbonate particles are present in an amount from about 10 wt-% to about 30 wt-%.

In certain aspects, the dried print has a print durability score of less than 10.

In certain aspects, the dried print has an overall print rating of greater than 4.

In certain aspects, the alcohol aqueous solvent comprises a high molecular weight alcohol and a lower molecular weight alcohol in a ratio of greater than about 1:1.

In certain aspects, the edible ink formulation comprises one or more binders.

In certain aspects, the binder is selected from hydroxypropylmethylcellulose (HPMC), hydroxypropylcellulose (HPC), methylcellulose, shellac, polyvinylpyrrolidone (PVP), carboxymethylcellulose (CMC), or sodium carboxymethylcellulose (NaCMC).

In certain aspects, the alcohol can be one or more of C2 to C6 alcohols selected from isopropanol, 1-propanol, ethanol, 1-butanol, 3-methyl-1-butanol (isoamyl alcohol), 2-butanol, and hexanol. In certain aspects, the aqueous solvent is water or a mixture of water and ammonia. The present disclosure further provides food products comprising the edible ink formulations. For example, the food product can be a confectionery product. In certain aspects, the confectionery product can be a hard-panned candy. The hard-panned candy can include a polish coating. Alternatively, the food product can be a snack food product.

The foregoing has outlined broadly the features and technical advantages of the present application in order that the detailed description that follows can be better understood. Additional features and advantages of the application will be described hereinafter which form the subject of the claims of the application. It should be appreciated by those skilled in the art that the conception and specific embodiment disclosed can be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

BRIEF DESCRIPTION OF THE DRAWINGS

FIG. 1 provides a printing rating system used to evaluate the resolution or sharpness and overall print quality of the printed images using the edible inks according to certain non-limiting aspects;

FIG. 2 provides an image of hard-panned candies, which have been pilot printed with a comparative edible ink formulation including an alcohol shellac based ink, as described in Example 1 and Table 1 (Comparative Formulation 1);

FIG. 3 provides an image of hard-panned candies, which have been pilot printed with an edible ink formulation including HPMC, alcohol, and water based ink, as described in Example 1 and Table 1 (Formulation 4);

DETAILED DESCRIPTION

Figure 4:
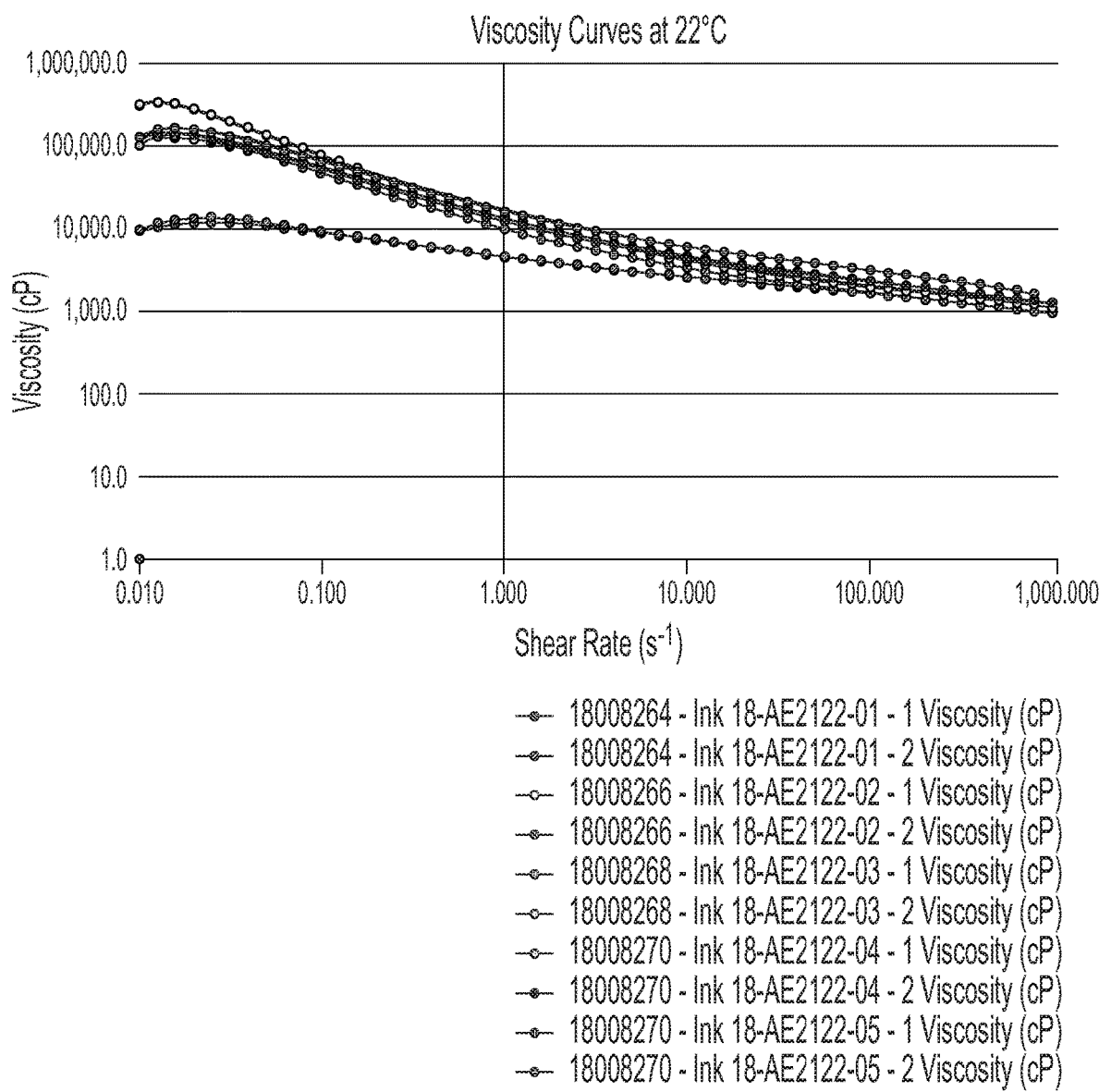
FIG. 4 depicts a viscosity curve of viscosity (cP) over shear rate ($s^{-1}$) of an edible ink formulation according to certain non-limiting aspects.

As noted above, to date, there remains a need in the art for an edible ink formulation that does not contain titanium dioxide, but which is able to provide desirable white color and provide improved visual print quality and print durability. The present disclosure provides such edible ink formulations, which include scalenohedral calcium carbonate particles as a white pigment. The edible ink formulations further include alcohol-aqueous-based solvents. These edible ink formulations are food-safe and can be used to provide white color to a variety of food products, confectionery products, and snack food products.

For clarity and not by way of limitation, this detailed description is divided into the following sub-portions:
1. Definitions;
2. Edible ink formulations;
3. Food products;
4. Methods of printing; and
5. Methods of preparation.

1. Definitions

The terms used in this specification generally have their ordinary meanings in the art, within the context of this disclosed subject matter and in the specific context where each term is used. Certain terms are discussed below, or elsewhere in the specification, to provide additional guidance to the practitioner in describing the compositions and methods of the disclosed subject matter and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and comprising" are interchangeable and one of skill in the art is cognizant that these terms are open-ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

As used herein, "food product" or "food product composition" includes ingestible products including but not limited to human foods, animal or pet foods, pharmaceutical products, and consumer products. The food products may be printed upon directly, or on a coating, shell, or glaze with the edible ink formulation. Typical coatings or shells may comprise sugars, polyols, fats, yogurt and combinations thereof. Additionally, the coatings of the food products may have a glaze coating comprising shellac, wax, or combinations thereof.

As used herein, the term "confectionery product" refers to a sweet or dessert food product. Confectionery products with surfaces suitable for the printing of an edible ink formulation can include, but are not limited to, candies (hard and soft), compressed mints, chewing gums, gelatins, chocolates, fudge, fondant, liquorice, taffy, jellybeans, and combinations thereof. The confectionery product may be printed upon directly, or on a coating, shell, or glaze of the confectionery product with the edible ink formulation. As used herein, the term "snack food product" refers to a sweet or savory food product, such as fruit snacks, chips/crisps, extruded snacks, ice cream, tortilla/corn chips, popcorn, pretzels, nuts, granola/muesli bars, breakfast bars, energy bars, fruit bars, other snack bars, and combinations thereof. Edible ink formulations may be applied directly to a snack food product, or on a coating, shell, or glaze of the snack food product.

As used herein, "viscosity" refers to the dynamic or shear viscosity of a material, e.g., a liquid edible ink formulation. Viscosity is indicative of the thickness of the material, or its resistance to flow. Viscosity can be expressed in terms of centipoise (cP). Viscosity can be measured using a viscometer, e.g., Model MCR 302 Controlled Stress Rheometer produced by Anton Paar GmbH, of Graz, Austria or Discovery Hybrid Rheometer—3, produced by TA Instruments, of New Castle, Delaware, USA.

As used herein, the terms "applied wet film thickness" or "wet film thickness" refer to the thickness of an edible ink formulation when applied to the surface of a product or a drawdown card to be treated and prior to being dried.

As used herein, the term "dried film thickness: refers to the thickness of an edible ink formulation when applied and dried to the surface of a product. It is the thickness of the ink formulation measured above the substrate to which it is applied and dried to.

As used herein, the term "weight percent" or "wt-%" refers to the quantity by weight of a component in a material (e.g., an edible ink formulation) as a percentage of the total wet weight of the material (i.e., prior to being dried).

As used herein, the term "scalenohedral shape" means that the calcium carbonate particles are not limited to any particular number of faces, but approximately every face of the particle is a scalene triangle.

As used herein, the term "overall print quality" means a rating of print quality as defined in FIG. 3. The rating of overall print quality is based on an assessment of the overall visual impression made by the printed 'm' image. The attributes of vibrancy of the print and completeness of the image are taken into account when making this assessment.

As used herein, the rating of print resolution (i.e., a "print resolution score") is based on an assessment of how well defined the "m" image is on the candy. The attributes for the resolution are how clear the outline of the print is and how evenly distributed the colorant is within the image.

As used herein, the term "print durability" is defined the difference in the number of printed product pieces showing print defects before and after a defined shake test based on a 100 piece sample set.

As used herein, the term "kinematic viscosity" is defined as the ratio of absolute (or dynamic) viscosity to density. The kinematic viscosity can be measured using a Zahn Cup and the value is expressed in centiStokes (cSt).

2. Edible Ink Formulations

The present application relates to improved edible ink formulations including a white pigment. The white pigment can be scalenohedral calcium carbonate (CaCO$_3$) particles. The edible ink formulation can produce a white color when printed onto a surface. The edible ink formulation can have optical properties similar to those exhibited by formulations containing titanium dioxide in order to produce a white edible ink formulation that can be used in place of formulations containing titanium dioxide. The edible ink formulation can have improved print quality and improved print durability.

In certain aspects, the dried edible ink formulation on the surface of a confectionery product can have a print durability rating of less that about 70, or less than about 60, or less than about 50, or less that about 40, or less than about 30, or less than about 20, or less than about 10, or less than about 5, or less than about 2. In a certain aspect, the dried edible ink formulation has a print durability rating of less than about 1.

In certain aspects, the dried edible ink formulation on the surface of a confectionery product can have an overall print quality score of about 4 or above, or about 5 or above, or about 6 or above, or about 7 or above, or about 8 or above.

In certain aspects, the dried edible ink formulation on the surface of a confectionery product can have a print resolution score of about 4 or above, or about 5 or above, or about 6 or above, or about 7 or above, or about 8 or above.

Although described in terms of edible white ink formulations, it should be understood that the edible ink formulation can be combined with other pigments or dyes to formulate other colors. For example, in certain aspects, the edible ink formulation can be combined with a black or gray pigment to form a gray ink. Suitable black pigments include iron oxides and vegetable carbon black. Alternatively, the edible ink formulation can be combined with one or more colored pigments or dyes, such as a red, orange, yellow, green, blue, or violet pigment or dye. Such pigments and dyes can be any artificial or non-artificial color, as known in the art. Combinations of artificial or non-artificial dyes or pigments can also be combined to give a black, or near black color, which can be added to a scalenohedral calcium carbonate ink to produce a gray ink.

As embodied herein, in addition to color properties, the edible ink formulation can have additional properties to facilitate the printing or application of the edible ink formulations to various surfaces. For example, the edible ink formulation can have a certain viscosity. The viscosity can be calibrated to be compatible with existing manufacturing equipment, e.g., printers. Additionally, or alternatively, the viscosity can be calibrated to be compatible with the surface. For example, a viscosity can be chosen such that the edible ink does not run or smudge when applied to a surface. For example, in certain aspects, the viscosity of the edible ink formulation can range from about 30 cP to about 500,000 cP. In other aspects, the viscosity of the edible ink formulation can range from about 30 cP to about 30,000 cP, from about 100 cP to about 10,000 cP, from about 500 to about 8000 cP, from about 1000 cP to about 7000 cP, from about 1000 cP to about 6000 cP, from about 1500 cP to about 5000 cP, or from about 2000 cP to about 4000 cP. Alternatively, the viscosity of the edible ink formulation can range from about 30 cP to about 300 cP, from about 300 cP to about 3000 cP, from about 3000 cP to about 300,000 cP. The edible ink viscosity can also have a certain kinematic viscosity. The kinematic viscosity of the edible ink can range from about 350 cSt to about 1500 cSt, from about 400 cSt to about 1000 cSt, from about 400 cSt to about 800 cSt. Preferably, the kinematic viscosity of the edible can range from about from about 400 cSt to 800 cSt, or is less than 800 cSt.

2.1. Calcium Carbonate

The presently disclosed edible ink formulations can include calcium carbonate, i.e., scalenohedral calcium carbonate particles. As used herein, "scalenohedral" refers to a particle shape, wherein approximately every face of the particle is a scalene triangle. The scalenohedral particles described herein are not limited to any particular number of faces, and need not be strictly scalenohedrons as long as the particles have a scalenohedral shape.

Precipitated calcium carbonate ("PCC") exists in three primary crystalline forms: calcite, aragonite and vaterite, with calcite being the most stable polymorph of calcium carbonate. There are many different polymorphs (crystal habits) for each of these crystalline forms. Calcite has a trigonal structure with typical crystal habits such as scalenohedral, rhombohedral, hexagonal prismatic, pinacoidal, colloidal, cubic, or prismatic. Scalenohedral calcium carbonate has been found to exhibit desirable light-scattering properties when incorporated into edible ink compositions.

For purpose of example, and not limitation, suitable scalenohedral particles are described in U.S. Patent Publication No. US2016/0023915, the contents of which are hereby incorporated by reference in their entirety. Further non-limiting examples of suitable scalenohedral particles include ViCALity™ particles from Minerals Technologies, Inc.

In certain non-limiting aspects, the calcium carbonate particles can have a mean particle size ranging from about 0.5 μm to about 15 μm, or from about 0.5 μm to about 8 μm, or from about 0.5 μm to about 5 μm, or from about 0.5 μm to about 3 μm, or from about 1 μm to about 3 μm, or from about 1.5 μm to about 3 μm.

In certain non-limiting aspects, an edible ink formulation comprising calcium carbonate particles can include a suitable amount of calcium carbonate particles. For example, in certain aspects, an edible ink formulation can include less than about 35 wt-% calcium carbonate particles, or less than about 30 wt-% calcium carbonate particles, or less than about 25 wt-%, or less than about 20 wt-% calcium carbonate particles. In certain aspects, an edible ink formulation can include from about 10 wt-% to about 30 wt-%, or from about 15 wt-% to about 25 wt-%, or from about 18 wt-% to about 25 wt-%, or from about 20 wt-% to about 23 wt-% calcium carbonate particles. The calcium carbonate particles can be prepared using any suitable method as known in the art. The preparation method can be chosen based on the desired shape and size of the calcium carbonate particles.

2.2. Additional Components

In certain aspects, the edible ink formulations can further include one or more additional components. For example, the edible ink formulations can include any suitable solvents and binders, as necessary to ensure suitable viscosity and compatibility with an underlying surface. As used herein, the term suitable viscosity means an ink viscosity that allows acceptable performance with the ink printing apparatus. As used herein, compatibility with the surface means an ink with wetting characteristics such that the application of the ink to the surface to be printed conforms to the intended design of the image.

As embodied herein, any additional materials included in the edible ink formulations should be compatible with the calcium carbonate pigment, so as to not detract from the white color provided by the calcium carbonate. Also, any additional materials should not detract from the performance of the ink in a transfer rotogravure printer and the effective transfer of the ink from one stage of the printer to the next, i.e., from the engraved roll to the rubber roll to the candy surface. Additional components include, but are not limited to, salts, fatty acids, celluloses such as carboxymethylcellulose, colorants, preservatives, natural or artificial flavor compounds, plasticizers, dispersants, emulsifiers, fillers, micronutrients, etc. A binder could be used to modify the particle surface.

2.2.1. Solvents

Solvents of the presently disclosed subject matter are alcohol and aqueous based and can include at least one alcohol in combination with water or an aqueous solution. In certain aspects, the solvents can include one alcohol, two alcohols, three alcohols, four alcohols, or more. For example, in certain aspects, suitable solvents can include one or more alcohols that are C2 alcohols to C6 alcohols. In certain aspects, the one or more alcohols can include but are not limited to isopropanol, 1-propanol, ethanol, 1-butanol, 3-methyl-1-butanol (isoamyl alcohol), 2-butanol, and hexanol. C2 to C3 alcohols are considered to be low molecular weight (MW) alcohols while C4 to C6 alcohols are considered to be high molecular weight alcohols. In certain aspects, two or more alcohols can be chosen such that one or more alcohol can be low MW and one or more can be high MW. In certain aspects, the aqueous component of the solvent can include a high proportion of high MW to low MW alcohols. In certain aspects the aqueous component of the solvent can be a solution of ammonium hydroxide in water. In certain aspects the aqueous component of the solvent can be water, a combination of water and ammonia, or a combination or water with other aqueous solvents. In certain aspects, the ratio of high MW alcohol to low MW alcohol on wt % basis can be greater than 1:1, or greater than 2:1, or greater than 3:1, or greater than 4:1, or greater than 5:1. In certain aspects, the ratio of high MW alcohol to low MW alcohol on wt % basis is between from about 3:1 and to about 10:1, or from about 4:1 and to about 9:1, or from about 5:1 and to about 8:1, or from about 5:1 and to about 10:1, or from about 6:1 and to about 10:1, or from about 7:1 and to about 10:1. Alternatively, the ratio of high MW alcohol to low MW alcohol on wt % basis is between from about 4:1 to about 8:1.

In certain aspects, the suitable solvent can include diols, such as propylene glycol (PG), polyethylene glycol (PEG), and glycerol. For further example, and without limitation, additional suitable alcohol-based solvents are described in 21 C.F.R. 73.1 (2016), the contents of which are hereby incorporated by reference in its entirety.

In certain aspects, a propylene glycol content of the edible ink formulation can be present in a range from about 0.1 wt % to about 15 wt %, from about 1.0 wt % to about 10 wt %, from about 2 wt % to about 7 wt %, from about 3 wt % to about 6 wt %, or from about 4 wt % to about 5 wt %.

In certain aspects, an alcohol content of the edible ink formulation can be present in a range of from about 30 wt-% to about 55 wt-%, from about 35 wt-% to about 52 wt-%, from about 37 wt-% to about 50 wt-%, or from about 40 wt-% to about 48 wt-%.

In certain aspects, an aqueous content of the edible ink formulation can be present at less than about 30%, less than about 25%, less than about 20%, or less than about 15%. In certain aspects, an aqueous content of the edible ink is present in a range of from about 10 wt-% to about 30 wt-%, from about 10 wt-% to about 25 wt-%, or from about 15 wt-% to about 20 wt-%.

The total solvent present in the edible ink formulation can be in a range of from about 30 wt-% to about 75 wt-%, from about 40 wt-% to about 70 wt-%, from about 50 wt-% to about 65 wt-%, or from about 60 wt-% to about 70 wt-%.

As demonstrated below, edible ink formulations including scalenohedral calcium carbonate particles and alcohol water-containing solvents were surprisingly found to have improved print quality and print durability compared to previous edible ink formulations. As disclosed herein, the formulations of the disclosed subject matter surprisingly and successfully address the challenges of having a $CaCO_3$ ink transfer effectively through a printer such as a rotogravure printer and deliver high print quality with high print resolution and high print durability.

2.2.2. Binders

Edible ink formulations according to the disclosed subject matter can further contain one or more binders. A binder is understood to refer to an ingredient that forms a continuous matrix which binds the pigment particles together and to the surface being printed after all the solvent is removed and the image cured on the substrate.

In the presently disclosed subject matter, the binder or mixture of binders is soluble in mixtures of alcohol and water or an aqueous solution. Additionally, or alternatively, suitable binders include resins, such as hydroxypropylmethylcellulose (HPMC), hydroxypropylcellulose (HPC), sodium carboxymethylcellulose (NaCMC), shellac, polvinvylpyrrolidone (PVP), or combinations thereof. In a preferred example the binder is hydroxypropylmethylcellulose (HPMC). If a cellulose binder is used, the degree of methoxyl substitution (DS), moles of hydroxypropoxyl substitution (MS), and degree of polymerization (measured in 2% solution viscosity) can be selected to achieve the desired flow characteristics of the ink formulation in suiting the method of application to a given substrate. By way of example, and without limitation hydroxypropylmethylcellulose (HPMC) is available from Dow Chemical Company as Methocel® E, F, and K which are derived from different cellulose ethers having different methoxyl substitution (DS), moles of hydroxypropoxyl substitution (MS), and degree of polymerization (measured in 2% solution viscosity).

In certain aspects, when the binder comprises shellac, the aqueous portion of the solvent can be a solution of ammonium hydroxide in water. For example, and not by way of limitation, the concentration of ammonium hydroxide in water can be about 14 wt-%.

The composition of the presently disclosed subject matter can include a binder in a range of from about 5 wt-% to about 20 wt-% or from about 7 wt-% to about 18 wt-% based on the total weight of the edible ink composition. In certain aspects, the binder is present in a range of from about 8 wt-% to about 16 wt-%, from about 9 wt-% to about 14 wt-%, or from about 10 wt-% to about 12 wt-% based on the total weight of the edible ink composition. In certain aspects, the binder is present in a range of from about 10 wt-% to about 11 wt-% based on the total weight of the edible ink composition.

In certain aspects, with HPMC as a binder, the ratio of high molecular weight alcohol (C4 to C6 alcohols) to low molecular weight alcohol (C2 to C3 alcohol) is greater than 1:1 on a weight percent basis.

3. Food Products

The edible ink formulations of the presently disclosed subject matter can be applied to the surface of various food products, such as pet snacks, cereal bars, ice cream etc., also including confectionery products such as candies (hard and soft), compressed mints, chewing gums, gelatins, chocolates, fudge, jellybeans, fondant, liquorice, and taffy. In other examples, the edible ink formulas are applied to fat-based or yogurt-based coatings applied to food products or confectionery products.

Surprisingly, Applicant has discovered edible ink formulations applied to fat-based or yogurt-based coatings have a tendency to fade. In order to alleviate edible ink color fading, a confectionery glaze (i.e., shellac coating) is applied to fat-based or yogurt-based coatings before the edible ink formulations are applied and dried.

In particular aspects, the edible ink formulation is applied to the surface of a hard-panned confectionery product. A hard-panned confectionery product can comprise a center core and at least one coating layer containing crystallized sugar. For example, and not by way of limitation, a hard-panned confectionery product can comprise a plurality of coating layers. For example, and not by way of limitation, the edible core can comprise chocolate. In certain aspects, the surface of the hard-panned confectionery product can further comprise a polish coating that is applied prior to the edible ink formulation. As such, the edible ink formulation can be printed as a dry film on the polish coating.

The hard-panned confectionery product can be a dragée type confectionery product. Non-limiting examples of the type of cores in a dragée type confectionery product can include a natural center (e.g., almond, hazelnut or groundnut) or a "confectionery" center (e.g., caramel, fondant or chocolate). The cores can then be coated with chocolate, with successive layers of sugars or other substances such as polyols, gums and natural polymers that can further include one or more color compositions.

In certain aspects, the methods for manufacturing hard-panned confectionery products can comprise the deposition of a plurality of sublayers, for example between about 5 and about 30, by a succession of phases of application and drying carried out, for example, in a pan. In a hard-panning process, multiple applications of a highly concentrated sugar syrup can be used to build up the uncolored portion of a sugar coating on an edible product center. This can be followed by multiple applications of a concentrated sugar syrup containing a colorant composition. In certain aspects, the hard-panning process comprises the repetitive application of thin layers of a coating solution or composition onto an intermixed mass of centers, and the drying of each layer of coating solution or composition during which the sugar in the coating crystallizes between the applications of layers. Additional non-limiting examples of methods for producing hard panned confectionaries are provided in International Patent Publication Nos. WO 2014/150438 and WO 2014/152417, the disclosures of which are incorporated herein by reference.

If the coating is to be colored, a colorant composition can be added to the coating solution in the later stages of the coating process. In some instances, for a hard-panned confectionery product, following the application of a number of layers of the uncolored sugar syrup to build up the sugar coating, a number of applications of a sugar syrup comprising a colorant composition are applied to provide the color coat. In certain aspects, the color coat can require 30 or more applications of a colored coating solution to achieve the desired color. A polish coating can be applied to the outer surface of the coating.

Alternatively, the food products can include snack food products such as fruit snacks, chips/crisps, extruded snacks, ice cream, tortilla/corn chips, popcorn, pretzels, nuts, granola/muesli bars, breakfast bars, energy bars, fruit bars, and other snack bars. In particular aspects, the food product can be a chocolate-coated or yogurt-coated food product. As a further alternative, the edible ink formulation can be used on the surface of a pharmaceutical product, such as a tablet, capsule, or coated pharmaceutical product, or any other consumer product with a suitable surface for edible ink printing.

When printed onto the surface of a product, the edible ink formulation can be localized to a particular region of the surface. For example, a shape, logo, lettering, or another localized image can be printed onto the surface of the product. Alternatively, the edible ink formulation can cover the surface, either as a solid coating across the entire surface or as a pattern across the entire surface.

4. Methods of Printing

The presently disclosed edible ink formulations can be applied to a surface, e.g., a surface of a food product, using any suitable method, as known in the art.

As embodied herein, and in certain aspects, the edible ink formulations can be applied using a contact printing process, such as an offset rotogravure process. In a contact printing process, the edible ink formulations can be transferred from a film or roller to the desired surface when contacted with the surface. The contact printing can be facilitated by pressure between the surface to be treated and the film or roller.

In certain aspects, the edible ink formulation can be dried, for example by heating, after application to the surface of the edible product.

In the offset rotogravure printing process, an engraved or etched roll (also known as the "transfer roller" or the "design roll") rotates partially submerged in a tray of ink which fills the engraved areas and the roll surface. As the roll rotates out of the ink tray, a doctor blade, which is pressed against the roll surface, removes the excess ink from roll surface. The engraved roll then makes tangential contact with the rubber printing roll (also known as the "printing roller" or the "printing roll"). A portion of the edible ink in the engraved area is transferred to the surface of the rubber roll. About one-half of the edible ink volume can be transferred from roll to roll and then again about one-half of the volume of the edible ink on the rubber roll is typically transferred to the candy. The rubber roll rotates further until it makes tangential contact with candy pieces and the ink is transferred to the candy which is conveyed in pockets in an 'endless belt' of carrier bars. For purpose of example, and not limitation, the offset rotogravure printing process and suitable printers are described in U.S. Pat. Nos. 2,859,689, 4,528,904, and 5,655,453, the contents of which are hereby incorporated by reference in their entirety.

For proper print image appearance, a higher quantity of $CaCO_3$-based ink may be needed to be printed onto a product as compared to a $TiO_2$-based ink. To achieve this, higher volume etches of the $CaCO_3$-based ink can be used. Etches used for $CaCO_3$-based ink can comprise, for example, from about 10% to about 300%, from about 10% to about 200% or from about 10% to about 100% more volume as compared to etches typically used for a $TiO_2$-based ink. The etch rolls of the present application may be modified by: 1) changing the volume of the etch within the etch rolls, and/or, 2) changing the coarseness of the etch (smooth vs. textured), depending on the substrate the edible ink formulation is applied.

Other suitable printing processes can be used, including but not limited to, digital printing, rotogravure, screen printing, flexo printing, offset lithography, inkjet printing, and pad printing. The scalenohedral $CaCO_3$ in the edible inks of the present disclosure are expected to provide good whiteness and opacity in other types of printing; however, the formulations would be different and performance in these other printer systems would need to be determined. Of course, application to inkjet printing would require adherence to particle size requirements for that technology.

In certain aspects, the surface can be modified prior to printing in order to facilitate adhesion of the edible ink formulation to the surface. For example, the surface can be etched or otherwise modified to provide a better surface to receive the edible ink formulation. Additionally, or alternatively, the surface can be textured to provide additional adhesion between the edible ink formulation and the surface. Additionally, or alternatively, an adhesive component, such as a binder, glaze, or surfactant, can be applied to the surface prior to or after the edible ink formulation to improve the adhesion of the edible ink formulation to the surface. As embodied herein, the edible ink formulation can be applied to the surface at a particular thickness. The thickness of the edible ink formulation can depend, for example, on the surface, the desired end use, and the desired opacity of the applied edible ink formulation. The thickness can be measured as an applied wet film thickness, referring to the thickness of a film of edible ink formulation when applied and prior to drying. For example, in certain non-limiting aspects, the applied wet film thickness can be from about 0.2 μm to about 60 μm, from about 2 μm to about 40 μm, from about 4 μm to about 30 μm, or from about 10 μm to about 20 μm. Alternatively, the wet film thickness is less than 60 μm. The thickness may can also be measured as dried film thickness—application after drying. For example, in certain non-limiting aspects, the dried film thickness can be from about 0.1 μm to about 30 μm, from about 1 μm to about 20 about μm, from about 2 μm to 15 μm, or from 5 μm to about 10 μm. Alternatively, the dried film thickness is less than 30 μm. The presently disclosed edible ink formulations including scalenohedral calcium carbonate particles are able to achieve desirable lightness even when applied at these small thicknesses.

4.1. Equipment

The drawdown and color measurement equipment and instrument details described in the present disclosure are shown below:
A). Discovery Hybrid Rheometer—3 (TA Instruments, New Castle, DE, U.S.A) Instrument Configuration
Upper Fixture: 60 mm Stainless steam Cone with 1.003° cone angle, 28 μm truncation gap, and solvent trap
Lower Fixture: TA Instruments Peltier plate with insulating covers and centering ring
Temperature: 23° C.
Solvent in Solvent trap: 1:1 IPA:water Solution B). ANTON PAAR GmbH, Graz, Austria—Controlled Stress Rheometer, Model MCR 302 Geometry: CP40-4 (cone and plate with a 40 mm diameter and 4° truncated cone)
Temperature: 22° C.
Test Profile: Logarithmic shear rate sweep covering the range of 0.01-1,000 s-1. 51 total data points collected using a logarithmic ramp collection mode starting at 20 s and finishing at 0.5 s to allow for steady-state equilibrium at each shear rate. 10 points collected per decade.
C). BYK Gardner USA (Columbia, Md., U.S.A.)
6 & 10 mils Double Bar Cat. No. 5302
Byko-chart opacity 2A 5.5×10 inches Cat. No. 2810
Leneta Company, Inc. (Mahwah, NJ)-Leneta Wire-Cators™
WC2.5, WC-3, WC-4, WC-6, WC-8, WC-10, WC-12, WC-16, WC-22, WC-28, WC-40, WC-52
Leneta Vacuum Plate VP-0912
Konika Minolta Sensing Americas, Inc. (Ramsey, NJ) CM-5 Spectrophotometer The Zahn cup and kinematic viscosity measurement equipment described in the present disclosure are shown below:

The Zahn cup (#1-5) was selected for the expected viscosity of the liquid to be evaluated. The cup and thermometer were immersed into the sample container and stirred to ensure for uniformity of temperature and density. The sample was then calibrated by leaving the Zahn cup in the sample for 5 minutes to stabilize the temperature. The cup was then lifted out of the sample container vertically by the ring of the cup. As the top of the cup broke the surface of the liquid, the timer was started. The timer was then stopped at the first definite break in the stream of liquid at the base of the Zahn cup.

The cup number, temperature, and time in seconds (Zahn seconds) were recorded. The viscosity was calculated by using the Zahn cup formulas.

| $V = K(T - C)$ | Zahn Cup # | Formula |
| --- | --- | --- |
| V = Kinematic Viscosity | 1 | $V = 1.1(T - 29)$ |
| T = Efflux Time (Zahn Seconds) | 2 | $V = 3.5(T - 14)$ |
| K and C are Constants | 3 | $V = 11.7(T - 7.5)$ |
| | 4 | $V = 14.8(T - 5)$ |
| | 5 | $V = 23(T - 0)$ |

Boekel Scientific; Feasterville, PA 19053
Boekel Zahn Cup Viscometer (#1 through #5) 44 mL Cup Volume The shaker details for print durability testing described in the present disclosure are shown below:
Burrell Scientific
Pittsburgh, PA 15205
Wrist Action Shaker model 75

The transfer rotogravure printing process and printer details described in the present disclosure are shown below:
Ackley Machine Corporation (Moorestown, NJ)
Rotogravure 5 inch Printer
Production 14 inch Printers

5. Methods of Preparation

5.1. Binder Alcohol/Water Edible Ink Preparation Method

An edible ink formulation including HPMC, alcohol, and water can be prepared by the following method. Using a stirrer (e.g., a motorized stirrer equipped with a cross blade impeller (Fisher Scientific), the predetermined amount of alcohol (e.g., isopropanol, butanol, isoamyl alcohol), propylene glycol, and an aqueous ingredient (e.g., deionized water or deionized water with ammonium hydroxide) can be combined into a container (e.g., a 32 oz. container). Binder can be added into the solvent solution portion-wise (over a period of approx. 1-5 minutes while mixing at approx. 500-1500 rpms). During the addition of binder, the speed (i.e., rpms) of the stirrer can be increased due to a thickening of the mixture. When the binder has been added, the container can be covered during mixing of the solution, for example, for minimal evaporation. The container can be secured by lead ring weights on the lid, for example, to reduce sample movement at increased speeds.

The sample can be continuously mixed until the binder is dispersed in the solvent system (e.g., for approx. 10-20 minutes at approx. 1400-1500 rpms). Once the binder is dissolved into solution, the predetermined amount of scalenohedral calcium carbonate can be added portion-wise to the solution while mixing (e.g., over the period of approx. 1-5 minutes). When the scalenohedral calcium carbonate has been added, the sample can be continually mixed with the stirrer (e.g., a motorized stirrer for approx. 15 minutes at approx. 1400-1500 rpms). When the sample is well mixed, the sample can be stored in a sealable container.

5.2. Shellac/Alcohol Edible Ink Preparation Method

An edible ink formulation including shellac and alcohol can be prepared by the following method. Isopropanol and flake shellac can be combined in a container (e.g., a 1 L plastic container with screw top). The solution can be sonicated (e.g., at approx. 60° C. for 5×100 minute cycles). After each cycle, the solution can be mixed on a vortex shaker (e.g., for approx. 1 minute) to disperse the shellac and then further sonicated. Upon dissolution of shellac, the remaining solvents can be added to the shellac solution while stirring using a stirrer (e.g., a motorized stirrer equipped with a cross blade impeller (Fischer Scientific). The shellac solution can be stirred at approx. 500 rpms. When the solvents the mixture have been added, the solution can be further stirred (e.g., at about 500-1500 rpms for approx. 2 minutes). Stirring can be continued and a predetermined amount scalenohedral calcium carbonate can be added portion-wise to the solution while mixing (e.g., over a period of approx. 1-5 minutes). When the scalenohedral calcium carbonate has been added, the sample can be continually mixed using a stirrer (e.g., for approx. 20 minutes at approx. 1400-1500 rpms). When the sample is well mixed, the sample can be stored in a sealable container.

EXAMPLES

The presently disclosed subject matter will be better understood by reference to the following Examples, which are provided as exemplary of the disclosure, and not by way of limitation.

Example 1: Comparison of Shellac/Alcohol Based Edible Ink Formulations and HPMC/Alcohol/Aqueous Based Edible Ink Formulations Ink compositions in accordance with various non-limiting aspects and comparative formulations were prepared and tested for print quality and print durability. Each formulation was measured resulting in an overall print score, resolution score, and a print durability score.

Shellac/Alcohol Based Ink (Comparative Formulation 1)

A first ink composition formulation was prepared (Comparative Formulation 1). Comparative Formulation 1 was a shellac and alcohol based ink including a scalenohedral calcium carbonate. The ingredients and proportions thereof are provided in Table 1. Comparative Formulation 1 included isopropanol (approx. 40.0% b.w.), isoamyl alcohol (approx. 20.0% b.w.), flake shellac (approx. 10.0% b.w.), and ViCALity™ Light $CaCO_3$ (approx. 30.0% b.w.), based on the total weight of Comparative Formulation 1.

Decolorized flake shellac (Stroever Schellack Bremen, SSB 56 Sonne FL Cat #0400 0001) was dissolved in isopropanol (Sigma Aldrich W292907). The solution was heated and stirred resulting in a homogeneous solution. The solution was cooled to ambient temperature and stirred with an overhead stirrer. The overhead stirrer included a crossed blade impeller. While the solution was stirred, additional alcoholic solvents as described in the formulation in Table 1 were added. Additional alcoholic solvents as described in the formulation in Table 1 were added as stirring continued. At this point any additives specified in the formulation were added and to mixture portion wise. The calcium carbonate (Specialty Minerals ViCALity™ Light) was added portion wise and stirring was continued for approximately 20 minutes (at approx. 1500-2000 rpm) following complete addition to produce a finished ink (Comparative Formulation 1).

Comparative Formulation 1 was run on an Ackley 5 inch offset rotogravure printer and used to print sugar shelled chocolate candies. The sugar shelled chocolate candies had various base colors. The overall print quality and print resolution was scored based on a 100 piece sample on a 10 point scale. The printed pieces are shown in FIG. 2. The printed candy was subjected to a shaking test to assess print durability. The overall print score, the resolution score, and the print durability score of Comparative Formulation 1 is shown in Table 2.

HPMC/Alcohol/Aqueous Based Inks (Formulations 2-4)

Ink composition formulations according to various non-limiting aspects were prepared (Formulations 2-4). The ink compositions (Formulations 2-4) included scalenohedral calcium carbonate with HPMC as the binder and an aqueous/alcohol solvent base. The ingredients and proportions thereof are provided in Table 1. Formulation 2 included isoamyl alcohol (approx. 37% b.w.), propylene glycol (approx. 4.0% b.w.), 13% $NH_4OH$ in water (approx. 20.0% b.w.), HPMC (approx. 10.0% b.w.), captex oil (approx. 4.0% b.w.), and ViCALity™ Light $CaCO_3$ (approx. 25.0% b.w.), based on the total weight of Formulation 2. Formulation 3 included isopropanol (approx. 4.625% b.w.), isoamyl alcohol (approx. 41.375% b.w.), propylene glycol (approx. 4.0% b.w.), 13% $NH_4OH$ in water (approx. 20.0% b.w.), HPMC (approx. 10% b.w.), and ViCALity™ Light $CaCO_3$ (approx. 20.0% b.w.), based on the total weight of Formulation 3. Formulation 4 included isopropanol (approx. 4.625% b.w.), 1-butanol (approx. 41.375% b.w.), propylene glycol (approx. 4.0% b.w.), water (approx. 20.0% b.w.), HPMC (approx. 10.0% b.w.), and ViCALity™ Light $CaCO_3$ (approx. 20.0% b.w.), based on the total weight of Formulation 4.

Using a motorized stirrer having a cross blade impeller (Fisher Scientific), the prescribed amount(s) of ingredients as provided in Table 1 (alcohols (e.g., isopropanol, butanol, or isoamyl alcohol) and propylene glycol, and the aqueous ingredient (e.g., deionized water or deionized water with ammonium hydroxide))) were combined into a container (e.g., a 32-oz container). Methocel E3 Premium was added into the solvent solution portion-wise over a period of approx. 1-5 minutes while mixing (at approx. 500-1500 rpm). During addition of the Methocel E3 Premium, the speed (rpms) on the motorized stirrer were increased due to thickening of the mixture. Upon addition of Methocel E3 Premium, the container was covered during mixing for minimal evaporation. The container was then held down by lead ring weights on the lid, for example, to reduce sample movement at higher mixing speeds.

The sample was continuously mixed until the Methocel E3 Premium was fully dispersed in the solvent system for approx. 10-20 minutes (at approx. 1400-1500 rpms). Upon dissolving of the Methocel E3 Premium into solution, the prescribed amount of ViCALity™ Light $CaCO_3$ was added portion-wise to the solution while mixing over the period of approx. 1-5 minutes. Following addition of ViCALity™ Light $CaCO_3$, the solution was mixed for approx. 15 minutes (at approx. 1400-1500 rpms).

The formulated inks (Formulations 2-4) were run on an Ackley 5" offset rotogravure printer and used to print sugar shelled chocolate candies. The sugar shelled chocolate candies had various base colors. The overall print quality and print resolution was scored based on a 100 piece sample on a 10 point scale. The printed candy was then subjected to a shaking test to assess print durability. The printed samples from Formulation 4 is shown in FIG. 3. The overall print score, the resolution score, and the print durability score of Formulations 2-4 are shown in Table 2.

Print Durability Testing

The print durability test compared the legibility of the print before and after a standard shaking procedure, based on the assessment 100 piece samples. The difference in the number score before and after shaking is the print durability score. Zero would be a highly desirable print durability score and 100 would be a least desirable print durability score. Preferably the print durability score is less than about 90, or less than about 80, or less than about 70, less than about 60, or less than about 50, or less than about 40, less than about 30, or less than about 20, or less than about 10, less than about 5, or less than about 3, or less than about 2, less than about 1, or most preferably about 0.

To perform the shaking test, a sample of printed candies (approx. 200 g) were placed into a plastic container (16 ounce). The plastic container was mounted on a shaker (Burrell Scientific Wrist Action Shaker model 75). To balance the machine during testing, the samples can be mounted in pairs. If only one sample was to be tested, a blank sample of similar weight is used for balance. The machine timer is set to approx. 30 seconds and the motion arm setting is set to 5. The machine is started and will shake the product vigorously for approx. 30 seconds. After shaking, 100 pieces of candy were arranged with print side up for evaluation of print legibility as provided herein.

Printed candies are collected from the printer and 100 lentils are placed on a tray and oriented with the printed side facing up. The number of "illegible" printed lentils were assessed in the following manner. If more than half of one leg of the 'm' or any sum of parts equaling more than half of one leg is missing the print is considered "illegible". This assessment is repeated on printed candies following the shaking describe above. The print durability score is calculated as the difference between "illegible" before shaking and "illegible" after shaking.

TABLE 1

Edible Ink Formulations

|  | Comparative Formulation 1 (wt-%) | Formulation 2 (wt-%) | Formulation 3 (wt-%) | Formulation 4 (wt-%) |
| --- | --- | --- | --- | --- |
| Isopropanol | 40.0 | — | 4.625 | 4.625 |
| Isoamyl alcohol | 20.0 | 37.0 | 41.375 | — |
| 1-Butanol | — | — | — | 41.375 |
| Propylene glycol | — | 4.0 | 4.0 | 4.0 |
| Water | — | — | — | 20.0 |
| 13% $NH_4OH$ in Water | — | 20.0 | 20.0 | — |
| Flake Shellac | 10.0 | — | — | — |
| HPMC | — | 10.0 | 10.0 | 10.0 |
| Captex Oil | — | 4.0 | — | — |
| ViCALity ™ Light $CaCO_3$ | 30.0 | 25.0 | 20.0 | 20.0 |
| Total % | 100.0 | 100.0 | 100.0 | 100.0 |

TABLE 2

Overall Print Score, Resolution Score, and Print Durability Score of Edible Ink Formulations

|  | Comparative Formulation 1 (wt-%) | Formulation 2 (wt-%) | Formulation 3 (wt-%) | Formulation 4 (wt-%) |
| --- | --- | --- | --- | --- |
| Overall Print Score | 6.0 | 7.0 | 7.0 | 7.0 |
| Resolution Score | 5.0 | 7.0 | 6.0 | 6.0 |
| Print Durability Score | 88 | 5 | 1 | 2 |

As shown in Table 2, the print durability score of Comparative Formulation 1 was higher than print durability scores of each of the formulations including an aqueous-alcohol based solvent, Formulation 2. Thus, the Comparative Formulation 1 including shellac/alcohol based inks had a decreased print durability as compared to the ink formulations including an aqueous-alcohol based solvent (Formulations 2-4).

FIGS. 2 and 3 are images of hard-panned candies, which have been printed with white edible ink formulations. FIG. 2 is an image of hard-panned candies printed with white edible ink formulations corresponding to Comparative Formulation 1. Comparative Formulation 1 was a shellac and alcohol based ink including a scalenohedral calcium carbonate. FIG. 3 is an image of hard-panned candies printed with white edible ink formulations corresponding to Formulation 4. Formulation 4 included scalenohedral calcium carbonate with HPMC as the binder and an aqueous/alcohol solvent base. In each of FIGS. 2 and 3, the top two rows comprise a brown, blue and green candy (from left to right), and the bottom two rows comprise a red, orange and yellow candy (from left to right).

Example 2: Viscosity of HPMC/Alcohol/Aqueous Based Edible Ink Formulations

Figure 5:
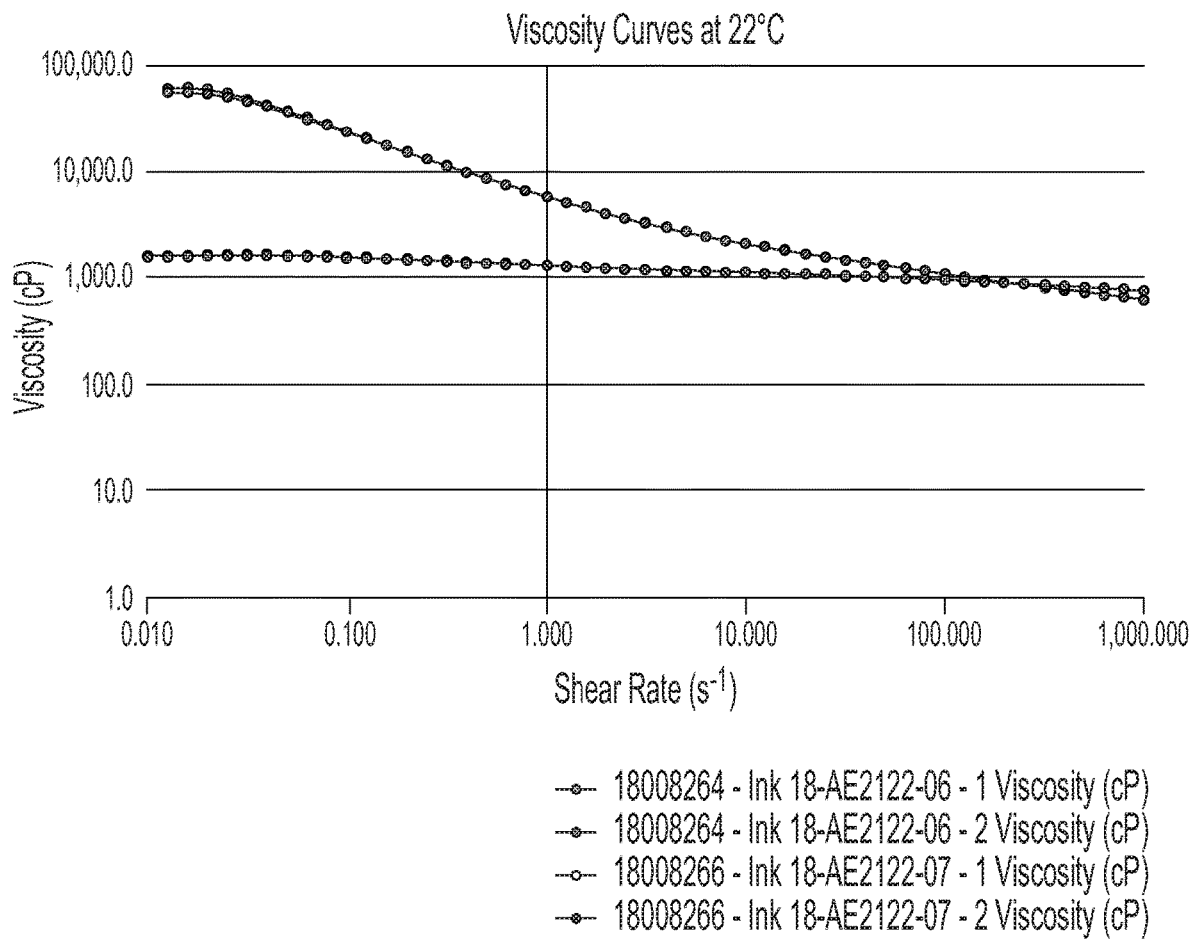
FIG. 5 depicts a viscosity curve of viscosity (cP) over shear rate ($s^{-1}$) of an edible ink formulation according to certain non-limiting aspects.
Figure 6:
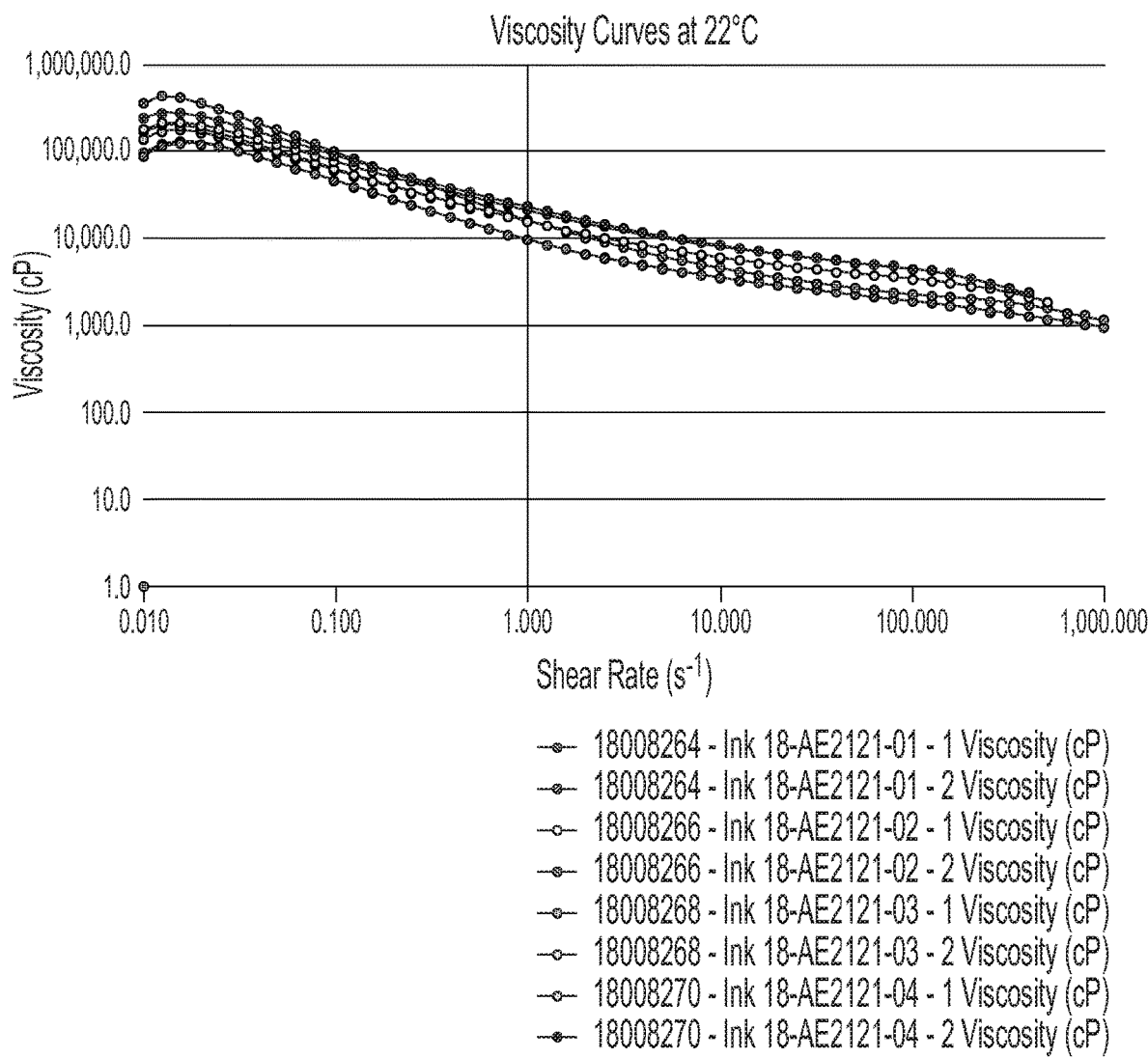
FIG. 6 depicts a viscosity curve of viscosity (cP) over shear rate ($s^{-1}$) of an edible ink formulation according to certain non-limiting aspects.
Figure 7:
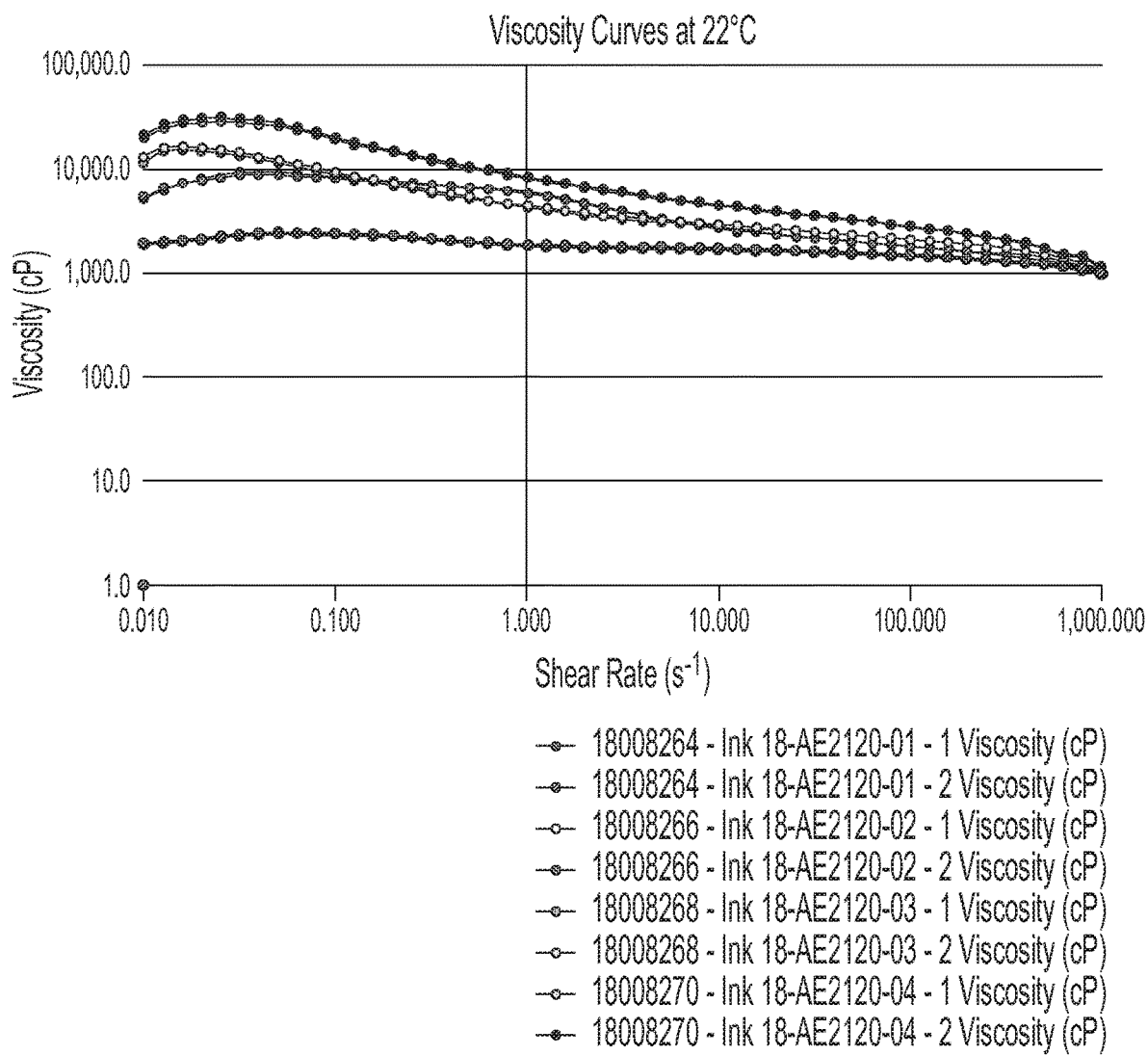
FIG. 7 depicts a viscosity curve of viscosity (cP) over shear rate ($s^{-1}$) of an edible ink formulation according to certain non-limiting aspects.

Edible ink formulations according to certain non-limiting aspects of the present disclosure were prepared and tested for viscosity. Graphical representations of the data pertaining to viscosity (cP) over shear rate ($s^{-1}$) are represented in FIGS. 4-7.

Example 3: Edible Ink Formulations

Edible ink formulations in certain non-limiting aspects of the present disclosure are provided in Table 3.

TABLE 3

Edible Ink Formulations

| Components | |
|---|---|
| Isopropanol | 45 |
| 13% Ammonium Hydroxide in Water | 20 |
| Flake Shellac | 10 |
| ViCALity Light Calcium Carbonate | 25 |
| Total | 100 |
| Overall Score | 6 |
| Resolution Score | 5 |
| Print Durability Score | Delta = 2 |
| Zahn Viscosity | 12 cSt |

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present application is not intended to be limited to the particular aspects of the process, machine, manufacture, composition-of-matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform the same function or achieve the same result as the corresponding aspects described herein can be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. An edible ink formulation, comprising scalenohedral calcium carbonate particles present in an amount of from about 10 wt-% to about 30 wt-%, an alcohol present in an amount of from about 30 wt-% to about 55 wt-%, an aqueous solvent, and a binder,
    wherein the alcohol aqueous solvent comprises a high molecular weight alcohol selected from the group consisting of 1-butanol, 3-methyl-1-butanol (isoamyl alcohol), 2-butanol, and hexanol and a low molecular weight alcohol selected from the group consisting of isopropanol, 1-propanol, and ethanol on wt-% basis in a ratio of from about 7:1 to about 10:1,
    wherein the binder is selected from hydroxypropylmethylcellulose (HPMC), hydroxypropylcellulose (HPC), methyl cellulose, polyvinyl pyrrolidone, and sodium carboxymethylcellulose (NaCMC), and
    wherein the edible ink formulation, when applied as a film, exhibits a print durability score of less than 70.

2. The edible ink formulation of claim 1, wherein the applied film is a wet film having a thickness of about 60 μm or less.

3. The edible ink formulation of claim 1, wherein the applied film is a dried film having a thickness of about 30 μm or less.

4. The edible ink formulation of claim 1, wherein the dried print has a print durability score of less than 10.

5. The edible ink formulation of claim 4, wherein the dried print has an overall print rating of greater than 4.

6. The edible ink formulation of claim 1, wherein the aqueous solvent is water or a mixture of water and ammonia.

7. A food product, comprising the edible ink formulation of claim 1.

8. The food product of claim 7, wherein the food product is a confectionery product.

9. The confectionery product of claim 8, wherein the confectionery product is a hard-panned candy.

10. The confectionery product of claim 9, wherein the hard-panned candy comprises a polish coating.

11. The food product of claim 7, wherein the food product is a snack food product.

12. The edible ink formulation of claim 1,
    wherein the binder is hydroxypropylmethylcellulose (HPMC).

13. The edible ink formulation of claim 12, wherein the edible ink is applied to a glazed coating.

14. The edible ink formulation of claim 12, further comprising one or more pigments selected from the group consisting of vegetable carbon black, iron oxides, artificial dyes, and non-artificial dyes.

15. An edible ink formulation, comprising scalenohedral calcium carbonate particles present in an amount of from about 10 wt-% to about 30 wt-%, an alcohol present in an amount of from about 30 wt-% to about 55 wt-%, an aqueous solvent, and a binder,
    wherein the alcohol aqueous solvent comprises a high molecular weight alcohol selected from C4, C5, and C6 alcohols and a low molecular weight alcohol selected from C2 and C3 alcohols on wt-% basis in a ratio of from about 7:1 to about 10:1, each of which is different from a diol,
    wherein the binder is selected from hydroxypropylmethylcellulose (HPMC), hydroxypropylcellulose (HPC), methyl cellulose, polyvinyl pyrrolidone, and sodium carboxymethylcellulose (NaCMC), and
    wherein the edible ink formulation, when applied as a film, exhibits a print durability score of less than 70.

* * * * *